(12) United States Patent
Petrovic et al.

(10) Patent No.: US 7,471,693 B2
(45) Date of Patent: Dec. 30, 2008

(54) MULTIPLE HARQ PROCESSES HANDLING METHOD

(75) Inventors: Dragan Petrovic, Darmstadt (DE); Eiko Seidel, Darmstadt (DE); Christian Wengerter, Kleinheubach (DE)

(73) Assignee: Panasonic Corporation, Osaka (JP)

( * ) Notice: Subject to any disclaimer, the term of this patent is extended or adjusted under 35 U.S.C. 154(b) by 90 days.

(21) Appl. No.: 10/524,141

(22) PCT Filed: Jun. 24, 2003

(86) PCT No.: PCT/EP03/06627

§ 371 (c)(1),
(2), (4) Date: Sep. 19, 2005

(87) PCT Pub. No.: WO2004/019544

PCT Pub. Date: Mar. 4, 2004

(65) Prior Publication Data

US 2006/0092972 A1    May 4, 2006

(30) Foreign Application Priority Data

Aug. 13, 2002 (EP) .................................. 02018086

(51) Int. Cl.
H04B 7/212 (2006.01)

(52) U.S. Cl. .................. 370/444; 370/322; 455/451; 455/512

(58) Field of Classification Search .................. 370/320, 370/322, 328, 329, 342, 395.4, 441, 443, 370/444
See application file for complete search history.

(56) References Cited

U.S. PATENT DOCUMENTS 6,021,124 A    2/2000    Haartsen (Continued)

FOREIGN PATENT DOCUMENTS

EP    1207647    5/2002

(Continued)

OTHER PUBLICATIONS

Ghosh, et al., "Performance of Coded Higher Order Modulation and Hybrid ARQ for Next Generation Cellular CDMA System," IEEE, pp. 500-505, 2000.

(Continued)

*Primary Examiner*—Chi H Pham
*Assistant Examiner*—Donald L Mills
(74) *Attorney, Agent, or Firm*—Dickinson Wright, PLLC (57) ABSTRACT

The invention concerns a method of managing a plurality of parallel hybrid ARQ processes including at least one of a reserved and/or additional HARQ process comprising the step of scheduling the available HARQ processes for transmission in accordance with at least one resource allocation parameter. Furthermore, the invention discloses a method of a plurality of hybrid HARQ processes including at least one of a reserved and/or additional HARQ process in a mobile communication system, wherein data flows are transmitted from a transmitter to a receiver comprising the steps of scheduling a number of transmission time intervals (TTI) in advance for a plurality of HARQ processes for transmission to the receiver, the step of predicting the channel conditions for the transmitted HARQ processes over at least one of the scheduled TTI and the step of assigning HARQ processes for transmission in accordance with the predicted channel conditions.

4 Claims, 6 Drawing Sheets

U.S. PATENT DOCUMENTS

| | | | |
|---|---|---|---|
| 6,693,910 | B2 | 2/2004 | Chao |
| 6,735,180 | B1 | 5/2004 | Malkamaki et al. |
| 2002/0001296 | A1 | 1/2002 | Lee et al. |
| 2002/0004924 | A1 | 1/2002 | Kim et al. |
| 2005/0022098 | A1* | 1/2005 | Vayanos et al. ............ 714/776 |
| 2005/0073987 | A1 | 4/2005 | Wu |

FOREIGN PATENT DOCUMENTS

| | | |
|---|---|---|
| WO | 03036844 | 5/2002 |
| WO | 03036844 | 5/2003 |

OTHER PUBLICATIONS

3GPP TR 25.848 v4.0.0(Mar. 2001) Technical Report, "3rd Generation Partnership Project; Technical Specification Group Radio Access Network; Physical Layer Aspects of UTRA High Speed Downlink Packet, Access (Release 4)," 3rd Generation Partnership Project Valbonne, France, www.3gpp.org, 3GPP Organizational Partners, 1, 2, 8-26 pages, Mar. 2001.

3GPP TS 25.308 v5.2.0 (Mar. 2002), Technical Specification, "3rd Generation Partnership Project; Technical Specification Group Radio Access Network; High Speed Downlink Packet Access (HSDPA); Overall description; Stage 2 (Release 5)," 3rd Generation Partnership Project, Valbonne, France, www.3gpp.org, 3GPP Organizational Partners, 1-30 pages, Mar. 2002.

PCT International Search Report dated Oct. 10, 2003.

S. Kallel, et al.; "Throughput Performance of Memory ARQ Schemes," IEEE Transactions on Vehicle Technology, IEEE Inc. New York, US, vol. 48, No. 3, May 1999, pp. 891-899, XP000906444, ISSN: 0018-9545.

3GPP TR 25.848 v4.0.0(Mar. 2001) Technical Report, "3rd Generation Partnership Project; Technical Specification Group Radio Access Network; Physical Layer Aspects of UTRA High Speed Downlink Packet, Access (Release 4)," 3rd Generation Partnership Project, Valbonne, France, www.3gpp.org, 3GPP Organizational Partners, pp. 1-89, Mar. 2001.

3GPP TS 25.308 v5.2.0 (Mar. 2002), Technical Specification, "3rd Generation Partnership Project; Technical Specification Group Radio Access Network; High Speed Downlink Packet Access (HSDPA); Overall description; Stage 2 (Release 5)," 3rd Generation Partnership Project, Valbonne, France, www.3gpp.org, 3GPP Organizational Partners, pp. 1-30, Mar. 2002.

3GPP TS 34.108 v4.1.0 (Dec. 2001) Technical Specification, "3rd Generation Partnership Project; Technical Specification Group Terminals; Common Test Environment for User Equipment (UE), Conformance Testing (Release 4)," 3rd Generation Partnership Project, Valbonne, France, www.3gpp.org, 3GPP Organizational Partners, pp. 1-420, Dec. 2001.

3GPP TSG RAN TS 25.331, "RRC Protocol Specification," Chapter 10.2.27, "Radio Bearer Reconfiguration," 3rd Generation Partnership Project, Valbonne, France, www.3gpp.org, 3GPP Organizational Partners, pp. 1-891, Mar. 30, 2002.

European Search Report dated Feb. 23, 2003.

PCT International Search Report dated Sep. 23, 2003.

S. Kallel, et al.; "Throughput Performance fo Memory ARQ Schemes," IEEE Transactions on Vehicular Technology, IEEE Inc., New York, US, vol. 48, No. 3, May 1999, pp. 891-899, XP000906444, ISSN: 0018-9545.

* cited by examiner

MULTIPLE HARQ PROCESSES HANDLING METHOD

FIELD OF THE INVENTION

This invention relates to incremental redundancy or hybrid ARQ Type II or III retransmission techniques in mobile communications systems and is particularly applicable to cellular systems.

BACKGROUND OF THE INVENTION

The most common technique for error detection of non-real time services is based on Automatic Repeat request (ARQ) schemes which is combined with Forward Error Correction (FEC), called hybrid ARQ. If an error is detected by Cyclic Redundancy Check (CRC), the receiver requests the transmitter to send additional bits. From different existing schemes the stop-and-wait (SAW) and selective-repeat (SR) continuous ARQ are most often used in mobile communication.

A data unit (PDU) will be encoded before transmission. Depending on the bits that are retransmitted three different types of ARQ are e.g. defined in S. Kallel, R. Link, S. Bakhtiyari, IEEE Transactions on Vehicular Technology, Vol. 48 #3, May 1999 "Throughput Performance of Memory ARQ Schemes".

Type I: The erroneous PDU is discarded and a new copy of that PDU is retransmitted and decoded separately. There is no combining of earlier and later versions of that PDU.

Type II: The erroneous PDU that needs to be retransmitted is not discarded, but is combined with some incremental redundancy bits provided by the transmitter for subsequent decoding. Retransmitted PDU's sometimes have higher coding rates and are combined at the receiver with the stored values. That means that only little redundancy is added in each retransmission.

Type III: Is the same as Type II only that every retransmitted PDU is now self-decodable. This implies that the PDU is decodable without the combination with previous PDU's. This is useful if some PDU's are so heavily damaged that almost no information is reusable.

This invention is related to Type II and Type III schemes, where the received (re)transmissions are combined. These schemes can be seen as a link adaptation technique, since the redundancy can be adapted according to the channel conditions as for example described in 3GPP TSG RAN, "Physical Layer Aspects of High Speed Downlink Packet Access TR25.848 V4.0.0" and in Amitava Ghosh, Louay Jalloul, Mark Cudak, Brian Classon, "Performance of Coded Higher Order Modulation and Hybrid ARQ for Next Generation Cellular CDMA Systems", Proceedings of VTC 2000.

Another technique that falls under this category of link adaptation, is adaptive modulation and coding (AMC). A description of AMC can be found in the above-mentioned documents. The principle of AMC is to change the modulation and coding format in accordance with variations in the channel conditions or system restrictions. The channel conditions can be estimated e.g. based on feedback from the receiver. In a system with AMC, users in favorable positions e.g. users close to the cell site are typically assigned higher order modulation with higher code rates (e.g. 64 QAM with R=¾ Turbo Codes), while users in unfavorable positions e.g. users close to the cell boundary, are assigned lower order modulation with lower code rates (e.g. QPSK with R=½ Turbo Codes).

In the following, different combinations of coding and modulation will be referred to as Modulation Coding Scheme (MCS) levels. A transmission will be split into Transmission Time Intervals (TTI), whereas the MCS level could change each TTI interval (for HSDPA the TTI is equal to 2 ms). The main benefits of AMC are firstly that higher data rates are available for users in favorable positions which in turn increases the average throughput of the cell and secondly reduced interference variation due to link adaptation based on variations in the modulation/coding scheme instead of variations in transmit power.

Figure 1:
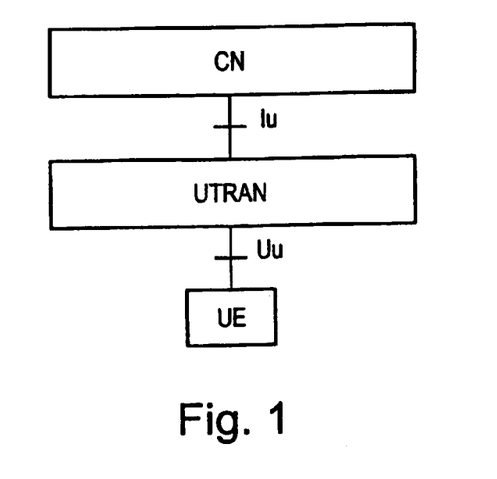
FIG. 1 shows a high level diagram of the UMTS architecture.

The high level architecture of Universal Mobile Telecommunication System (UMTS) is shown in FIG. 1. The network elements are functionally grouped into Core Network (CN), UMTS Terrestrial Radio Access Network (UTRAN) and User Equipment (UE). UTRAN is responsible for handling all radio-related functionality, while CN is responsible for routing calls and data connections to external networks. The interconnections of these network elements are defined by open interfaces as can be seen in the Figure. It should be noted that UMTS system is modular and it is therefore possible to have several network elements of the same type.

Figure 2:
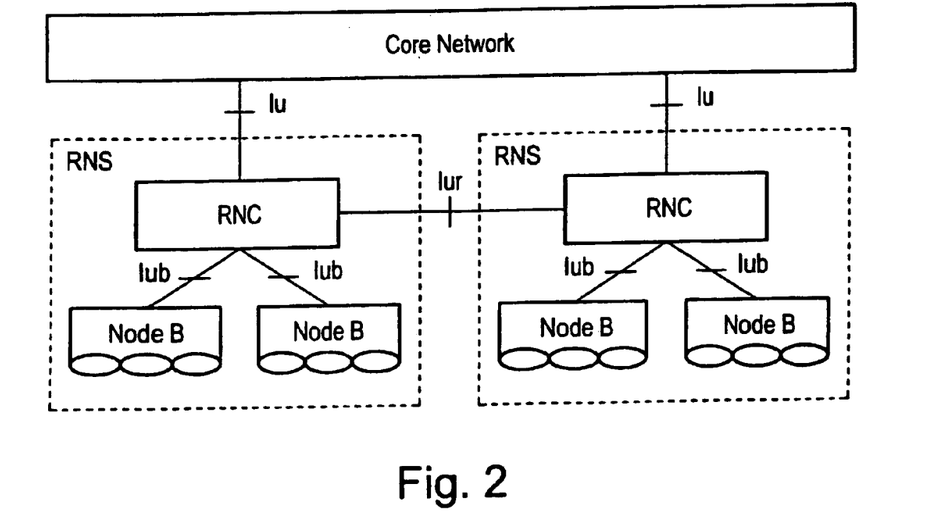
FIG. 2 illustrates the current architecture of UTRAN.

FIG. 2 illustrates the current architecture of UTRAN. A number of RNCs (Radio Network Controllers) are connected via wired or wireless links (Iub) to the CN. Each RNC controls one or several base stations (Node Bs) which in turn communicate via wireless links (not shown) with the UEs.

High Speed Downlink Packet Access (HSDPA) is a new technique that is standardized (see for example, 3GPP TSG RAN "Physical Layer Aspects of High Speed Downlink Packet Access TR25.848" V4.0.0 or TSG RAN TR 25.308:

"High Speed Downlink Packet Access (HSDPA): Overall Description Stage 2", (V5.2.0). It shall provide higher data rates in the downlink by introducing enhancements at the Uu interface such as adaptive modulation and coding. HSDPA relies on hybrid Automatic Repeat Request protocol (HARQ) Type II/III, rapid selection of users which are active on the shared channel and adaptation of transmission format parameters according to the time varying channel conditions. The invention is particularly applicable to HSDPA but is not restricted to this system.

Therefore the data transmission does not necessarily have to be in the downlink nor does it depend on a particular radio access scheme.

Figure 3:
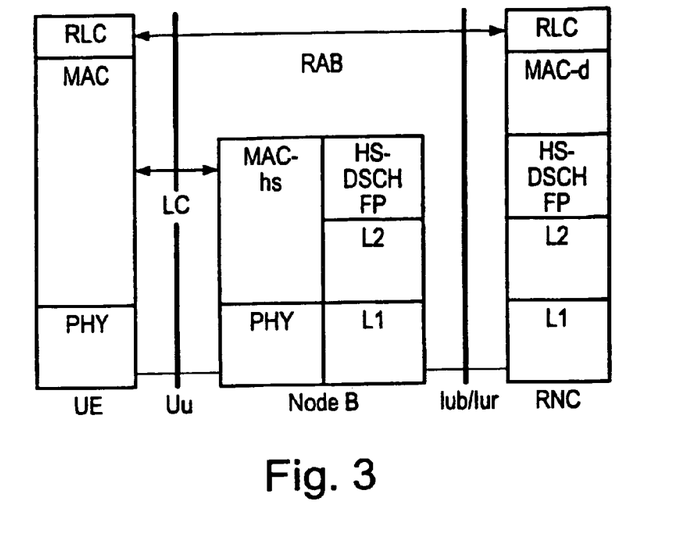
FIG. 3 shows a user plan radio interface architecture of HSDPA.

The User Plane Radio Interface Protocol Architecture of HSDPA is shown in FIG. 3. The HARQ protocol and scheduling function belong to the Medium Access Control High Speed (MAC-hs) sublayer which is distributed across Node B and UE. It should be noted that an SR ARQ protocol based on sliding window mechanisms could be also established between RNC and UE on the level of the Radio Link Control (RLC) sublayer in an acknowledged mode. Parameters of the protocols are configured by signalling in the control plane. This signaling is governed by a Radio Resource Control (RRC) protocol. The service that is offered from RLC sublayer for point-to-point connection between CN and UE is referred to as Radio Access Bearer (RAB). Each RAB is subsequently mapped to a service offered from MAC layer. This service is referred to as Logical Channel (LC).

The performance of high speed packet transmission may depend on technical characteristics of the mobile UE capabilities. These could be signaled from the UE entity to the RNC entity during connection establishment using the RCC protocol.

Over a feedback channel information is sent from the receiver to the transmitter that notifies the transmitter whether a data packet has been acknowledged (ACK) or not (NAK).

Usually there is some delay until ACK/NAKs can be sent, due to processing time the transmitter spends on demodulation and decoding. HARQ Type II/III schemes put severe requirements on the receiver's memory size to store the soft decision values for subsequent combining. This buffer is in the following called soft buffer.

One method to overcome this constraint is to introduce a very fast feedback channel without an involvement of the Radio Link Control (RLC) protocol in RNC and UE. A scheduler is located in Node B so that retransmissions can be rapidly requested thus allowing small delays and high data rates.

Figure 4:
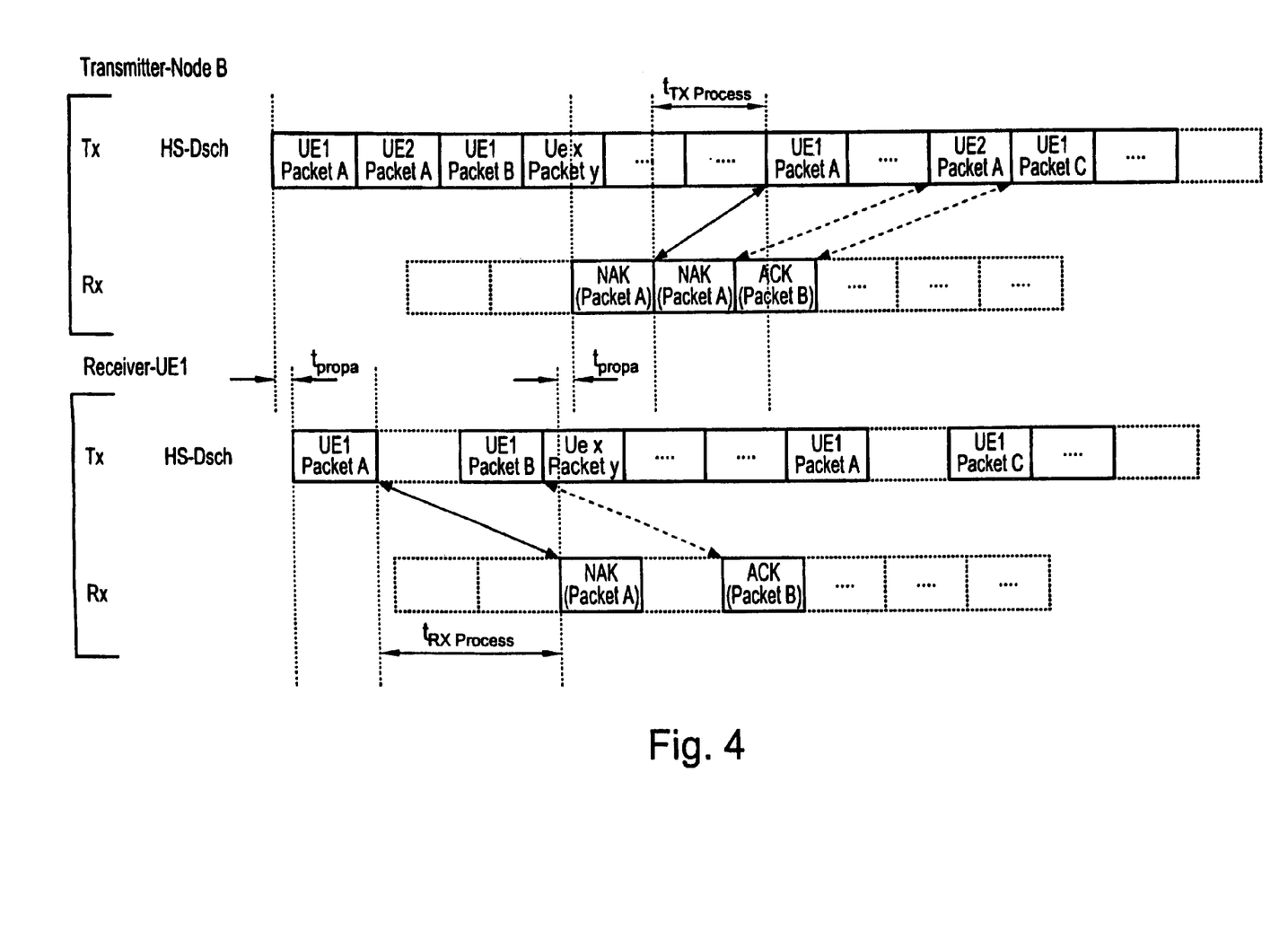
FIG. 4 shows exemplarily the timing relations of a HARQ process.

The functional behavior of one HARQ process is illustrated in FIG. 4. A physical channel is used to transmit data to a receiver. In this case it is a so-called HS-DSCH (High Speed—Downlink Shared Channel), where different users are time multiplexed. As apparent from the figure, a transmitter Base Station (Node B) transmits to a receiver called User Equipment (UE1). Node B transmits (Tx) a data packet A to the UE1. Before the data is received (Rx) by the UE1 there is a propagation delay. UE1 will demodulate and decode the packet A. After a UE1 processing time of $t_{RX process}$ an ACK or NAK will be sent (depending on if the packet A has been received correctly or not). In this case UE1 sends a NAK assuming that Packet A has not been received correctly. If the NAK has been received and decoded correctly by the transmitter ($t_{propa}$ introduced once again by the radio channel), the transmitter can decide to resend the data packet after a processing time $t_{TX process}$. Thus the number of data packets that have to be stored depends on the number of simultaneously active HARQ processes.

Figure 5:
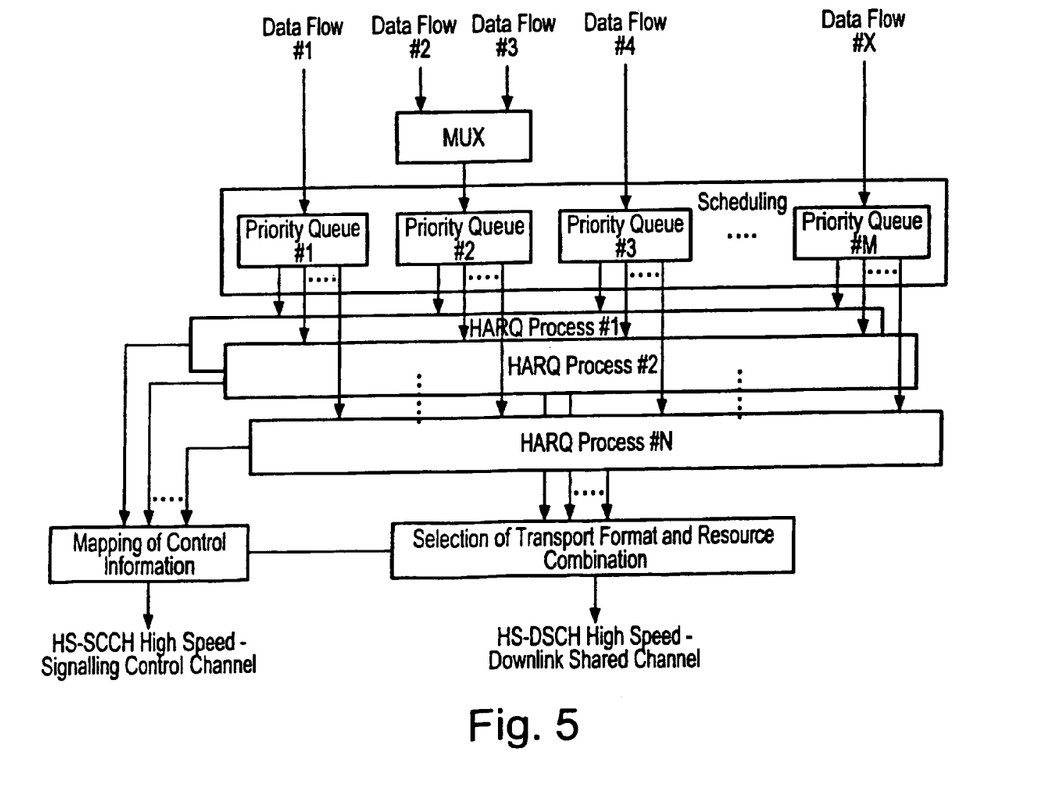
FIG. 5 shows the high level architecture of an HSDPA base station.

A high level architecture of HSDPA Base Station is depicted in FIG. 5. It is assumed there are #1 . . . # X different data flows (logical channels) with data packets to be transmitted from the Node B to the User Equipment (UE). The set of HARQ transmitting and receiving entities, located in Node B and UE respectively, will be referred to as HARQ processes. The maximum number of HARQ processes per UE is usually predefined. These data flows can have different Quality of Services (QoS), e.g. delay and error requirements and may require a different configuration of HARQ instances.

The scheduler will consider these parameters in allocating resources to different UEs. The scheduling function controls the allocation of the channel (HS-DSCH) to different users or to data flows of the same user, the current MCS level in one TTI and manages existing HARQ instances for each user.

A data flow or even a particular packet of a data flow may have a different priority. Therefore the data packets can be queued in different priority queues. Different data flows with similar QoS requirements may also be multiplexed together (e.g. data flow #3 and #4). Besides the HS-DSCH that carries the data packets there is control data which is mapped onto a High Speed—Shared Control Channel (HS-SCCH). This could carry data such as the HARQ process ID, the modulation scheme, code allocation, transport format etc. that is needed by the receiver to correctly receive, demodulate, combine and decode the packets.

As said before, the scheduler decides which of the N HARQ processes shall be used for transmission. Each HARQ process can have different window sizes. In HSDPA there is only a single HARQ process scheduled each TTI and each process works as a SAW protocol which corresponds to selective repeat ARQ with window size 1. In the example illustrated in FIG. 4, a retransmission can be scheduled after 5 transmission time intervals (TTI). It is not possible to schedule the same HARQ process earlier if packet combining shall be used because the processing is still ongoing. The HARQ process number as well as the sequence number has to be signalled separately to allow a proper combining even if the packet is not received correctly. In HSDPA the 1 bit sequence number is called New Data Indicator (NDI). Each time a new packet has been sent, the NDI is incremented. In HSDPA the HARQ process ID and the NDI are signalled on the HS-SCCH.

Furthermore in HSDPA each packet has a Transmission Sequence Number (TSN) for reordering of correctly received packets. This information is signalled inband (of the HS-DSCH) in an header that is part of the packet. The TSN is increased for new each packet that is send by the transmitter. The receiver will check the TSN after successful decoding of an packet and deliver the packet only to higher layer if there is no previous packet of that data flow missing. In case of missing packets the received packet will be stored in the reordering buffer to wait for outstanding packets and to ensure in sequence delivery to higher layer. If the reordering buffer is full because the receiver is waiting for an outstanding packet for a long time the transmission must be stopped to avoid dropping or overwriting of packets. This situation is called stalling and can reduce the data throughput significantly. The stalling can be mitigated by different means such as time out timer, window forwarding etc. The receiver recognizes that it will not receive certain packets anymore and continues operation.

Usually a retransmission has a higher priority compared to new transmissions to reduce overall delay. Thus a packet will be scheduled every 6 TTI for successive erroneous decoding. A basic method is to adapt the number N of HARQ processes or the window size of a ARQ process to the round trip time. A practical implementation in this case would be an N channel Stop-and-Wait ARQ process. Continuous transmission while considering the round trip delay can be assured by switching between the HARQ processes every TTI. To support different priorities, a new transmission can be initiated on a HARQ process at any time even though there is a retransmission pending for that process. This will cause the UE soft buffer of the process to be flushed.

In a system using N-channel SAW ARQ processes the number of HARQ processes is chosen according to the round trip delay to provide continuous transmission while minimizing the number of processes. In the same manner will the window size be selected according to the RTT for window based ARQ mechanisms. Since the RTT can vary during transmission so the initial configuration may not be optimum anymore.

Different data flows can have different QoS and will therefore also have different process configurations (e.g. maximum number of retransmissions). A scheduler may preempt a certain transmission according to QoS attributes (priority, delay requirement, guaranteed bit rate and other parameters) known by the scheduler. The formulation preemption of higher priority data over lower priority data will be used in the following although the reason for preemption may be a QoS attribute other than priority (e.g. delay requirement).

After the UE data was scheduled to the appropriate HARQ process the transport format (e.g. transport block size) and resource combination (e.g. number and index of codes) for the data need to be selected. Depending on the channel conditions different MCS levels and thus packet sizes can be scheduled.

Figure 6:
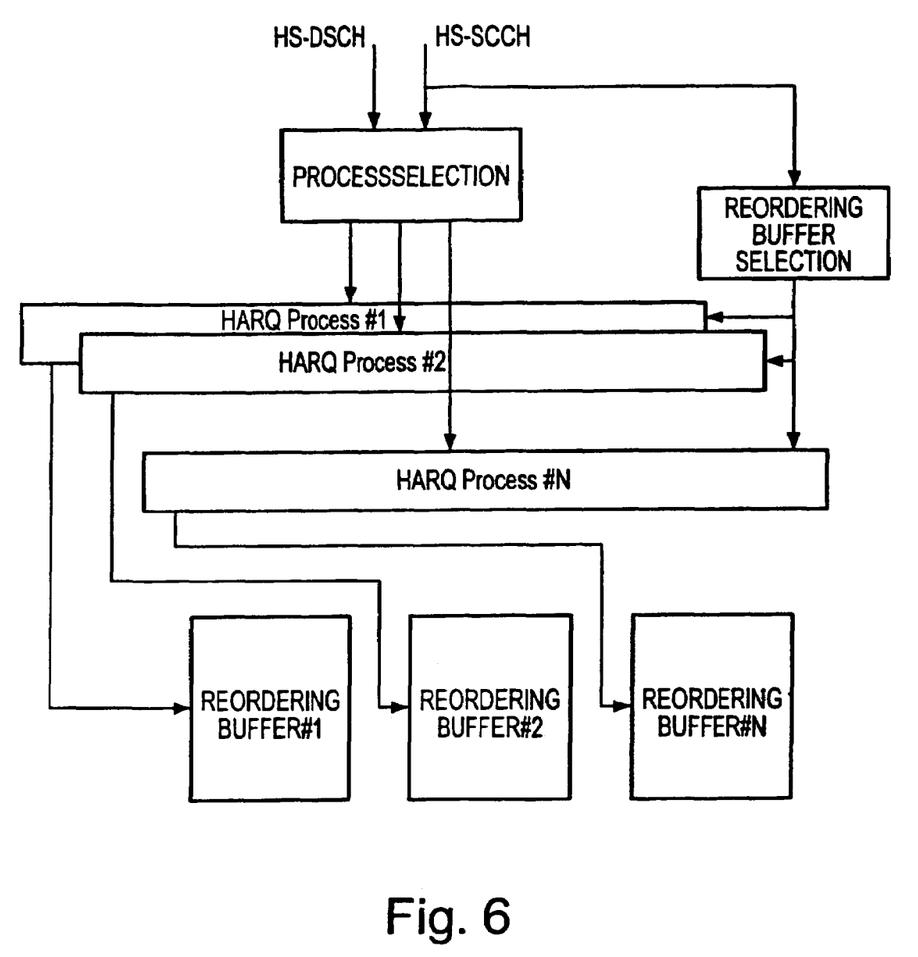
FIG. 6 illustrates a high level architecture of an HSDPA mobile station.

The UE HSDPA architecture is shown in FIG. 6. It can be noted that each HARQ process is assigned a certain amount of soft buffer memory for combining the bits of the packets from outstanding retransmissions. Once a packet is received successfully, it is forwarded to the reordering buffer providing the in-sequence delivery to RLC sublayer. According to the conventional architecture, the reordering queue is tied to a specific priority.

It should be noted that the available soft buffer size depends on the UE radio access capability parameters. Processing time of UE for a certain MCS level and minimum inter-TTI interval (minimum time between two successive scheduling instants) can also be considered as capability parameters. These are signaled from the UE to the RNC by RRC protocol and further from RNC to Node B.

One constraint for current communication systems is that different priorities as part of QoS requirements of data need to be supported efficiently. Future packet switched applications will have low rate signalling (e.g. session initiation protocol) which is more delay critical than the data. Thus signalling in parallel to the data stream itself will have higher priority. In particular in mobile communication systems there is high priority radio resource signalling such as to prepare for or to carry out handover when changing the serving cell. Other radio resource management information may also be scheduled in-between of data transmission. This signalling is usually of low rate, but has to be very fast to avoid packet or even call drops.

Further, downlink messages are generally significantly larger than uplink messages since they typically include more parameters as described in more detail in 3GPP TSG RAN TS 25.331 "RRC Protocol Specification", V 5,0.0. At the same time, the signalling between RNC and UE using radio bearers mapped on dedicated channels is slow due to delays in the transport network between RNC and Node B and due to a larger TTI of dedicated channels. For example, as mentioned in 3GPP TSG RAN TS 34.108 "UE Conformance Testing", V 4.1.0, signalling radio bearers configured for downlink interactive traffic with a peak rate of 2048 kbps is configured with a payload in RLC packets of 136 bits and a TTI of 40 ms, that is with data rate of 3.4 kbps. For a typical RRC message size of 150 octets, signalling delay is 390 ms, assuming transport network delay of approximately 30 ms. For the payload corresponding to the lowest MCS in HSDPA (240 b), HSDPA TTI is equal to 2 ms and minimum inter-TTI interval is equal to 2 ms, signaling delay is 20 ms assuming 2 retransmissions per packet. Thus, it may be beneficial to route some signalling traffic over HSDPA connection.

Due to deep and long fades, which are likely when a mobile is located near the cell edge, it may happen that all HARQ processes are simultaneously in the state of combining packets. In such cases it could be required to handover to a different cell. Some signalling is required for this purpose. However, scheduling any new data to the occupied processes will result in flushing the contents of the UE soft buffer for these particular processes. This causes an inefficient use of radio resources because already transmitted packets (although not received correctly and currently in the process of combining) are discarded. It should be noted that the packet size of the data that is discarded could be quite large compared to the one of higher priority signalling.

Another problem that occurs in case of insequence delivery to higher layer is stalling. The flushing of packets could cause gaps in the reordering entity. Already successfully received packet can not be delivered to higher layer because previous packets are missing. If the flushed data can be resend, the problem is less severe, but still more retransmissions will be required because combined bits of the unsuccessfully received packets were discarded.

In a co-pending application it has consequently been proposed to have some HARQ processes either reserved or additional HARQ processes which are pre-configured for high priority data. This allows the efficient support for data flows of different priorities and in particular for delay critical signalling.

If the Node B receives low rate and delay sensitive data such as higher priority signaling, it will switch to the reserved or additional HARQ processes (if required), instead of using engaged HARQ processes which would cause the UE soft buffer to be flushed. Furthermore the Node B or RNC will signal to use a separate reordering queue for such data to avoid delays caused by reordering for in sequence delivery.

According to the conventional architecture, any HARQ process can be used for any priority queue. According to the above-mentioned co-pending application, it is proposed to restrict the use of HARQ processes. Some HARQ processes may be limited for specific data flows of high priority or small transport format and resource allocation, while other HARQ processes may maintain full flexibility. Such HARQ processes of limited use will be called reserved HARQ processes. By this it is ensured that high priority data can be sent without waiting for completion of outstanding retransmissions or flushing the UE soft buffer of an HARQ process.

It should be noted that the restricted use of some HARQ processes limits the scheduling in particular for continuous transmission. It also reduces data throughput since the number of HARQ processes with full flexibility is insufficient for continuous transmission during round trip delay.

In another embodiment of above-mentioned co-pending application, it has been proposed to increase the number of HARQ processes with respect to the minimum required by RTT to accommodate higher priority data. These additional HARQ processes which may also have limited functionality are in the following called additional HARQ processes. The limited functionality will most likely be caused by reserving smaller soft buffer sizes for additional HARQ processes. Thus, only some (lower) MCS can be scheduled with this processes.

Additional HARQ processes also cause an increased signalling range for identifying the HARQ process to the UE. The signalling of the HARQ process ID via a shared control channel is usually done by a fixed number of bits. Additional bits for the signalling may not be necessary because the number of HARQ processes that can be signalled is in the range of the power of two (e.g. 8 HARQ processes).

The method of configuring an additional HARQ process consequently requires that additional soft buffer memory is reserved for combining. In order to address such constraints, once an HARQ process is added, it may be possible to restrict its usage just for certain MCS levels, e.g. restrict its usage for certain packet sizes. Thus, the soft buffer size for such limited HARQ processes is minimized.

An additional advantage of adding an HARQ process resides in the fact that all ongoing regular HARQ processes are not affected and that consequently the data throughput is not reduced.

Reservation or addition of HARQ processes enables delivery of delay sensitive high priority data. However, it is also necessary to define the strategy that is used in transmitter's scheduler for these cases.

The object of the present invention is consequently to provide a method of managing a plurality of parallel hybrid ARQ processes in a mobile communication system, which allows intelligent scheduling for efficiently support data flows of different priorities. This object is solved by a method as defined in claims 1 and 7.

DETAILED DESCRIPTION OF EMBODIMENTS

According to the invention, the transmitter checks the state of all available HARQ processes and if all regular processes are ongoing, i.e. are in the state of combining packets, reserved or additional ARQ processes shall be used. This decreases the latency for packets having high priorities and moreover efficiently uses the available radio resources.

For example, if the available soft buffer memory in the UE is low, only a reservation of processes is possible. In this case, throughput will be decreased. Furthermore, sometimes it is possible to configure additional processes only with limited soft buffer size, that is with some restrictions in the MCS levels that can be used. Thus, during good channel states, additional processes could also be configured without significantly decreasing the throughput.

According to an embodiment of the invention, the scheduler in the transmitter shall select the HARQ processes, which includes additional HARQ processes, reserved HARQ processes or just HARQ processes with limited soft buffer capabilities. The scheduling is performed in accordance with at least one resource allocation parameter which could be one of Modulation Coding Scheme (MCS) level, transport format, e.g. packet size, traffic transcriptor, priority, data flow ID or logical channel ID. For example, the use of reserved or additional HARQ processes may be restricted to signalling having a separate data flow ID or to data packets of high priority.

A traffic descriptor could for instance indicate the kind of data (e.g. control data, radio resource control, SIP signalling etc.) to the transmitter. Based on this, the transmitter knows the characteristics of that data and how it shall be transmitted. Thus a proper selection of the HARQ channel can be performed.

The packet size will have the main impact on the transport format. For small packets only a limited number of resources need to be allocated (e.g. codes, frequencies, time slots). Even if a low code rate is used to make the transmission more reliable there may not be a need for higher order modulations, etc. and a low MCS level could be used. Therefore based on these parameter the transmitter can select an additional or reserved or HARQ process.

In the following, another embodiment of the scheduling algorithm according to the invention will be explained in further detail.

The simplest form of a scheduling algorithm in the Node B is non-predictive scheduling. This method maximizes overall system throughput by scheduling always the user having the best channel condition at a given time instant relative to other users. It should also be noted that the performance of the algorithm depends on the aggressiveness in MCS assignment. Should the scheduler allocate always the highest possible MCS, it may occur that all HARQ processes except reserved or additional ones are in the state of packet combining. These processes must not be used in order to avoid flushing of data. If an additional process with limited functionality is used in the current TTI, the MCS is not only selected based on channel conditions, but also so that available soft buffer is not exceeded.

Another form of scheduling algorithm is predictive scheduling wherein a number of TTI are scheduled in advance. If different data flows are scheduled consecutively to a UE, an intelligent HARQ process assignment can be used. The scheduler should consider the transport formats required for the transmissions and select the most suitable soft buffer size needed for the different HARQ processes. With this it is ensured that always the most suitable HARQ process is used without wasting capacity of the UE soft buffer.

Figure 7:
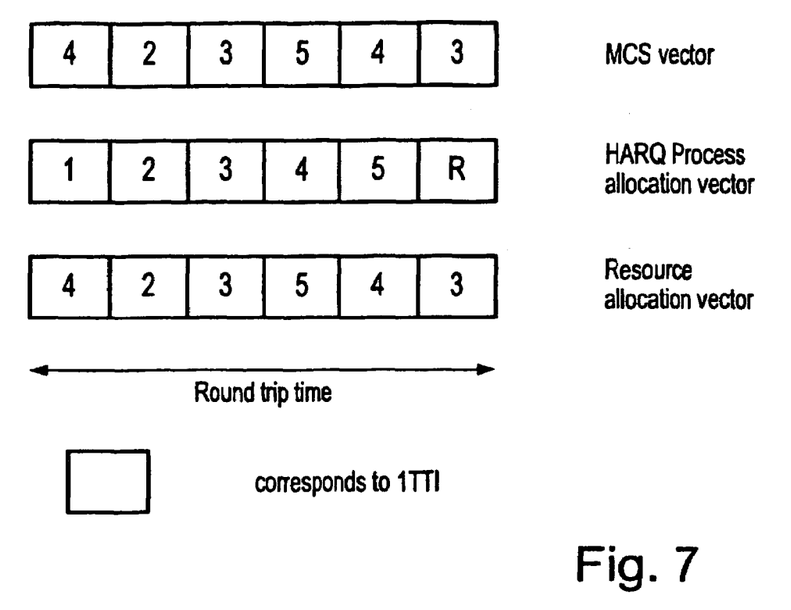
FIGS. 7-9 illustrate several examples of predictive scheduling HARQ processes.

Predictive scheduling performance is a tradeoff between channel prediction accuracy and prediction length. Channel prediction performance decreases with increasing prediction length. On the other side, it is easier to find optimal resource allocation with respect to a QoS requirement with a longer prediction horizon. In the following examples illustrated in FIGS. 7-9, it is assumed that channel prediction is given 6 TTIs in the future, that is a certain MCS level can be allocated to any of 6 TTIs according to the predicted channel state.

In the first example (FIG. 7), processing time is equal to prediction horizon and one HARQ process is reserved for high priority data. Data transmission to the same UE is consecutively scheduled for 6 TTIs. MCS vector denotes the possible MCS level according to predicted channel conditions. HARQ process allocation vector denotes the number or type of process allocated to transmissions in certain TTIs. Round trip time is equal to prediction horizon and HARQ processes are allocated for $6^{th}$ TTIs in advance. Resource allocation vector denotes the actual MCS level that is used in the transmissions. In the $6^{th}$ TTI high priority packets are routed to a reserved process (R) without any restriction in MCS level.

In the second example (FIG. 8), round trip time is less than prediction horizon and is equal to 5 TTIs. One HARQ process is additional and with limited functionality (that is, only the lowest MCS level 1 can be used for transmission with this process). Data transmission to the same UE is consecutively scheduled for 6 TTIs (prediction horizon). HARQ processes are allocated 5 TTIs in advance, while the decision on process allocation in the $6^{th}$ TTI is deferred until receiving first feedback. After round trip time, a NACK for process 1 has arrived, but also high priority data packets are available for instantaneous transmission. It is not possible to use processes 2-5 because feedback has not been received for them. It is not possible to use process 1 either because it is in the state of packet combining. Thus, the high priority packets will preempt pending retransmission for process 1 and will be scheduled to an additional process (A). It should be noted that the available MCS level according to channel prediction is level 3. However, due to limited functionality of the additional process, MCS level 1 is allocated in the resource allocation vector.

Figure 8:
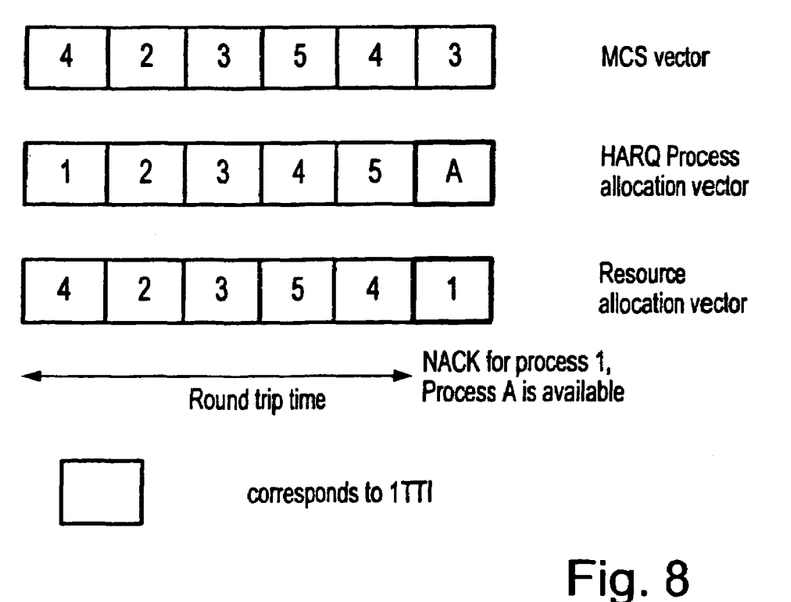
Figure 9:
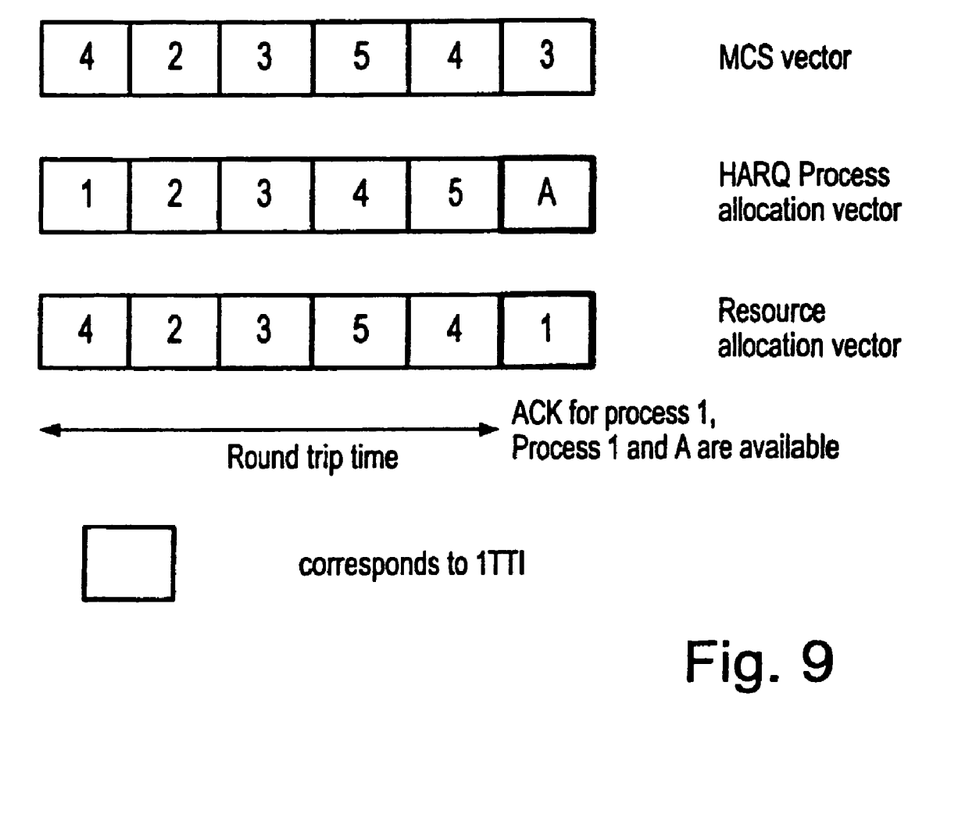

The assumptions for the third example (FIG. 9) up to the expiry of the round trip time are identical as for the second example (FIG. 8). After round trip time, ACK for the process 1 has been received. Thus, processes 1 and A (additional process) are available at that time instant. We will further assume that no high priority data is pending for transmission, but that there are some low priority packets that can be transmitted by using the lowest MCS level 1. The scheduler will rather use process A for these packets thus preserving process 1 for high rate and high priority data.

Apart from the retransmission protocol at the MAC-hs sublayer, there can also be a retransmission protocol in RLC sublayer (if configured to work in acknowledged mode) and in reliable transport control protocol layer (e.g. TCP). To reduce latency, it may be useful to assign the packets retransmitted by higher layers to reserved/additional HARQ processes.

The invention discloses an intelligent method for a flexible scheduling of multiple parallel hybrid ARQ processes while transmitting data of different priority. The latency is reduced without having to flush the data bits corresponding to outstanding retransmissions in the soft buffer of the UE. Based on resource allocation parameters, such as data flow ID, priority, traffic descriptor, packet size etc. associated to the data, the transmitter selects one of the available HARQ processes to satisfy QoS requirements. By employing intelligent non-predictive and predictive scheduling methods and for a given soft buffer size, the transmitter uses the available radio resources efficiently.

The invention claimed is:

1. A method of managing a plurality of hybrid automatic repeat requests (HARQ) processes involving packet combining of data flow transmitted in a wireless communication system, said method comprising the steps of:

reserving at least one HARQ process out of the plurality of HARQ processes in accordance with at least one resource allocation parameter; and restricting employment of the at least one reserved HARQ process for a specific data flow of high priority having a separate data flow identifier or a logical channel identifier as the resource allocation parameter.

2. The method according to claim 1, wherein the reserved HARQ process carries signaling data for radio resource control or other higher layer signaling.

3. A transmission apparatus for managing a plurality of hybrid automatic repeat requests (HARQ) processes involving packet combining of data flow transmitted in a wireless communication system, said apparatus comprising:

a reservation section that reserves at least one HARQ process out of the plurality of HARQ processes in accordance with at least one resource allocation parameter; and a restriction section that restricts employment of the at least one reserved HARQ process for a specific data flow of high priority having a separate data flow identifier or a logical channel identifier as the resource allocation parameter.

4. The apparatus according to claim 3, wherein the reserved HARQ process carries signaling data for radio resource control or other higher layer signaling.

* * * * *